United States Patent Office 3,000,910
Patented Sept. 19, 1961

3,000,910
17-ISONITROSE-3-AMINOETHERS OF THE ANDROSTANE SERIES
Robert D. Birkenmeyer, Daniel Lednicer, and Fred Kagan, Kalamazoo, and Barney J. Magerlein, Portage Township, Kalamazoo County, Mich., assignors to The Upjohn Company, Kalamazoo, Mich., a corporation of Delaware
No Drawing. Filed Apr. 7, 1961, Ser. No. 101,342
7 Claims. (Cl. 260—397)

This invention relates to new steroid compounds and is particularly concerned with 17-isonitroso-3-aminoethers and 17-isonitroso-3-aminothioethers of 3β-hydroxy steroids of the androstane series having the formulae:

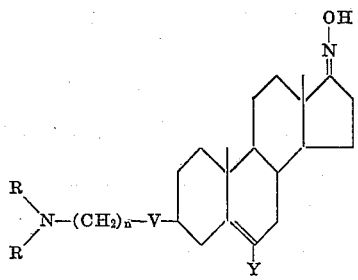

and

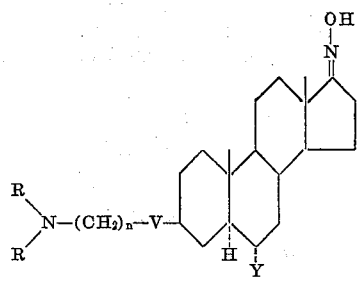

wherein $n$ has a value of 2 to 6, inclusive; wherein

is selected from the group consisting of

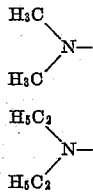

and

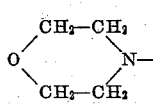

wherein V is selected from the group consisting of the elements oxygen and sulfur; and wherein Y is selected from the group consisting of methyl and hydrogen.

Furthermore, the invention relates to the N-oxides of the above defined products and the mineral acid salts of the above defined products, particularly the hydrochlorides and sulfates.

Additionally, the invention is concerned with the process of production for the above compounds.

The process of production of the compound of the structure shown above essentially comprises: conversion of a selected 3-aminoether or 3-thioaminoether of a 17-keto-androstane or -androstene steroid to the corresponding 17-isonitrosoandrostane or -androstene steroid by reaction with hydroxylamine hydrochloride in the presence of a base e.g. potassium or sodium hydroxides, acetates or, pyridine, piperidine, alkylpyridine and the like.

Treatment of such produced 17-oximes with a mineral acid produces the 3-aminoether salt.

The compounds produced by these reactions have hypocholesteremic activity. The compounds are thus useful in the treatment of atherosclerosis which is a form of arteriosclerosis which is characterized by the fatty degeneration occurring in the arterial walls, by mechanisms not yet definitely established. It has been observed, however, that hypercholesteremia is a common finding in human subjects with atherosclerosis. Hypercholesteremia refers essentially to an excess of cholesterol in the blood serum. While the causes of hypercholesteremia and the nature of its role in atherosclerosis and related conditions is not clearly understood, considerable effort has been directed toward reducing blood and tissue cholesterol levels as an attack upon the clinical conditions in which high levels are implicated. It has long been recognized that certain substances such as sitosterol, corn oil, and nicotinic acid are capable of reducing in small degree the blood and tissue cholesterol contents, either by interfering with the absorption of exogenous cholesterol introduced with food, or by facilitating the excretion of cholesterol from the body. Major emphasis, however, has been placed on the search for compounds which will interfere with the production of endogenous cholesterol by the liver and hence offer a more positive means of control of cholesterol levels.

The novel compounds of the present application significantly reduce the cholesterol content of both blood and tissue by partially arresting the biosynthesis of cholesterol in the body.

The new compounds, especially in their hydrochloric acid salt form, are also active against parasite-produced diseases in man or animal. They are particularly active against species of Trypanosoma, such as *Trypanosoma equiperdum* and Trichomonas such as *Trichomonas vaginalis*, *Entamoeba histolytica*, *Entamoeba coli* and against many of the eggs and larvae of common animal and human parasites. The novel materials, therefore, can be used against *Trichomonas vaginalis*, incorporated into suppositories or bougies, or, can be used in sprays and as powders, in animal bedding, for cattle or poultry in order to prevent parasitic diseases.

The new compounds have also antifertility properties and can be used in female domestic animals (cats, dogs) to prevent pregnancy at times inconvenient to the owner. Since pregnancy of the animal is only avoided during the period of administration (oral or by injection) of the selected compound, no permanent sterility, such as caused by spaying, is produced.

The starting compounds for the process of this application are prepared as shown in the preparations.

The process of the present invention comprises treating the selected 3-aminoether or 3-aminothioether of a 17-keto-androstane or 17-keto-androstene steroid with either hydroxylamine or its mineral acid salt such as hydroxylamine hydrochloride or hydroxylamine sulfate in a suitable solvent such as an alkanol, for example, methanol, ethanol, propanol, isopropanol, butanol or a tertiary amine for example pyridine, collidine, N,N-dimethylaniline and the like or preferably an alcohol in the presence of a base reagent such as a tertiary amine, sodium or potassium hydroxides, carbonates or acetates to give the corresponding 17-isonitroso steroid. This process is broadly referred to as oximation. An excess of hydroxylamine salt, usually from 1.1 to 5 molar equivalents per mole of steroid is preferably employed. The preferred hydroxylamine mineral acid salt is hydroxylamine hydrochloride. Alternatively, hydroxylamine itself can be used in place of the hydroxylamine salt and base.

The reaction is preferably carried out at 20 to 120 degrees centigrade and conveniently at the reflux temperatures of the reaction mixture. Under this condition the reaction time is usually from 10 minutes to 48 hours. Both higher and lower temperatures and shorter and longer reaction times are operative. The lower temperature requires, of course, a corresponding longer reaction.

The reaction product thus obtained can be isolated from the reaction mixture by conventional methods, for example, separating undissolved inorganic material from the solution through filtration of the reaction mixture, when in an organic solvent, and thereupon evaporating the filtrate, to obtain the nitroso steroid. Alternatively, the reaction mixture may be poured into water and the resultant precipitate (the nitroso steroid) separated by filtration. Additional purification of the product can be accomplished by conventional methods, for example, by recrystallization from suitable solvents or a mixture of solvents such as methanol, dilute methanol, ethanol, isopropanol, ether, methylene chloride, methylene chloride-Skellysolve B (hexanes) and the like.

The starting materials for these 17-isonitroso steroids are prepared as shown in the preparations.

PREPARATION 1

3β-(2-diethylaminoethoxy)-5-androsten-17-one hydrochloride

A mixture of 100 grams of dehydroepiandrosterone, 100 milliliters of ethylene gylcol, 1500 milliliters of benzene and 2 grams of para-toluenesulfonic acid were heated under reflux for a period of five hours while removing water from the condensate with a trap. The reaction mixture was thereupon cooled to 30 degrees, washed with 200 milliliters of 5 percent potassium bicarbonate solution, dried over sodium sulfate and finally 200 milliliters of benzene was distilled to complete the drying process. To the residue there was added 0.37 mole of butyl lithium, dissolved in hexane, followed by 0.38 mole of diethylaminoethyl chloride, dissolved in toluene. The reaction mixture was heated under reflux for 23 hours. The mixture was then cooled, diluted with 1 liter of ether and extracted with three successive 800 milliliter portions of dilute hydrochloric acid (80 milliliter of concentrated hydrochloric acid diluted with water to 800 milliter). The aqueous extract was washed with 800 milliliters of ether. The combined organic extracts were dried and evaporated to yield 35 grams of recovered dehydroepiandrosterone.

The aqueous solution was extracted with 800 milliliter, 400 milliliter, and again 400 milliliter portions of methylene dichloride. These combined extracts were dried and concentrated. The residue was dissolved in a minimum of methylene dichloride and added to 2 liters of ether. The precipitate was collected by filtration, washed with ether and dried. 79 grams (53.8 percent yield) of 3β - (2-diethylaminoethoxy) - 5 - androsten-17-one hydrochloride of melting point 197–201° and rotation $[\alpha]_D^{23}$ of plus 17 degrees in methanol was obtained.

PREPARATION 2

3β-hydroxy-6-methyl-5-androsten-17-one

To a solution of 3.5 grams of 3β-hydroxy-6-methyl-5-androsten-17-one 3-acetate [J. Chem. Soc. (London) 4105 (1957)] in 30 milliliters of ethanol was added a solution of 80 milligrams of potassium hydroxide in two milliliters of water. The mixture was allowed to stand for a period of four hours under occasional shaking and was then poured into 150 milliliters of water. The solution was neutralized with dilute hydrochloric acid and the precipitate which was thus obtained was removed by filtration and washed with water. The material was twice recrystallized from methanol to get pure 3β-hydroxy-6-methyl-5-androsten-17-one.

PREPARATION 3

3β-mercapto-6-methyl-5-androsten-17-one

A mixture of 2 grams of 3β-hydroxy-6-methyl-5-androsten-17-one, 5 milliliters of pyridine and 5 milliliters of para-toluenesulfonyl chloride was allowed to stand at room temperature for a period of four hours. Thereafter the mixture was poured into 100 milliliters of water and this mixture was allowed to stand over night in a refrigerator. The mixture was then filtered and the product recrystallized from methanol two times to give 3β-para-toluenesulfonate of 3β-hydroxy-6-methyl-5-androsten-17-one.

1.5 grams of 3β-hydroxy-6-methyl-5-androsten-17-one 3-para-toluenesulfonate, 3 grams of thiourea, 1.8 milliliters of pyridine and 18 milliliters of ethanol were refluxed on a steam bath for four hours. The mixture was diluted with water and left in a refrigerator for 20 hours at a temperature of about 5 degrees centigrade. The thus precipitated crystals were collected, washed with 25 percent alcohol and 75 percent water solution and thereupon recrystallized three times from methanol and acetone to give 3-isothiuronium p-toluenesulfonate of 3β-hydroxy-6-methyl-5-androsten-17-one of formula

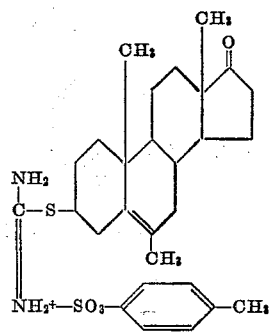

600 milligrams of the 3-(isothiuronium para-toluenesulfonate) of 3β-hydroxy-6-methyl-5-androsten-17-one was refluxed with a solution of 0.15 gram of sodium hydroxide in 15 milliliters of ethanol. To this mixture 1.2 milliliters of water was added and the mixture was refluxed for additionally 2 hours on a water-bath and thereafter poured into ice water. The mixture was acidified with glacial acetic acid whereupon a finely divided precipitate separated. The precipitate was collected, washed with water and recrystallized from benzene petroleum ether mixture to give pure 3β-mercapto-6-methyl-5-androsten-17-one.

PREPARATION 4

3β-(2-diethylaminoethoxy)-5-androsten-17-one N-oxide hydrochloride

To a solution of 3β-(2-diethylaminoethoxy)5-androsten-17-one hydrochloride (3.5 grams), dissolved in 20 milliliters of methanol, was added 10 milliliters of a 5 percent solution of sodium hydroxide in methanol. After swirling for 5 minutes the mixture was filtered and the filtrate evaporated to dryness under vacuum. The residue was dissolved in 100 milliliters of methylene dichloride which was then washed with three 25 milliliter portions of water. The methylene dichloride phase was filtered and then evaporated to dryness under vacuum, yielding 2.34 grams of the free base of the starting hydrochloride. This white solid material was dissolved in 10 milliliters of ethanol, cooled in an ice bath and 5 milliliters of 30 percent hydrogen peroxide solution added. After standing at about 25 degrees for 18 hours, the excess hydrogen peroxide was destroyed by portionwise addition of 500 milligrams of platinum oxide catalyst. Filtration and evaporation of the filtrate gave a white solid which was dissolved in ether. Hydrogen chloride gas was bubbled into this solution and the white solid which precipitated was collected, dried and recrystallized twice from acetone to give 3β-(2-diethylaminoethoxy)-5-androsten-17-one N-oxide hydrochloride of melting point 156 to 159.

*Analysis.*—Calcd. for $C_{24}H_{42}ClNO_3$: C, 68.23; H, 9.62; N, 3.18; Cl, 8.06. Found: C, 68.29; H, 9.78; N, 3.27; Cl, 8.16.

PREPARATION 5

*3β-(2-diethylaminoethoxy)-5α-androstan-17-one hydrochloride*

3β-(2-diethylaminoethoxy)-5-androsten-17-one hydrochloride (1.1 grams) was dissolved in 200 milliliters of methanol and reduced in a Parr hydrogenator at 30 to 50 p.s.i. of hydrogen pressure using about 1 gram of 5 percent palladium on carbon as reduction catalyst. After one hour the theoretical amount of hydrogen had been taken up, the reaction solution was filtered to remove the catalyst and the filtrate evaporated to dryness. The solid residue was recrystallized four times from a mixture of acetone-Skellysolve B hexanes to give 3β-(2-diethylaminoethoxy)-5α-androstan-17-one hydrochloride monohydrate of melting point 164 to 165 degrees, with a yield of 500 milligrams.

*Analysis.*—Calcd. for $C_{25}H_{43}NO_2 \cdot HCl \cdot H_2O$: C, 67.76; H, 10.24; N, 3.16; Cl, 8.00. Found: C, 67.81; H, 10.12; N, 3.29; Cl, 8.17.

Further heating to 60° C. in a vacuum desiccator resulted in the anhydrous material, 3β-(2-diethylaminoethoxy)-5α-androstan-17-one hydrochloride.

PREPARATION 6

*3β-(2-diethylaminoethylthio)-5-androsten-17-one hydrochloride*

A mixture of 0.35 mole of 3β-mercapto-5-androsten-17-one, 100 milliliters of ethylene glycol, 1500 milliliters of benzene and 2 grams of p-toluenesulfonic acid were heated and refluxed for five hours. The water produced is removed from the reaction mixture by use of a water trap. The reaction mixture was then cooled to 30 degrees, washed with 200 milliliters of 5 percent potassium bicarbonate solution, dried over anhydrous sodium sulfate and finally 200 milliliters of benzene was distilled from this mixture to complete the drying process. To the dry benzene solution was added 0.37 mole of butyllithium, dissolved in hexane, followed after 15 minutes by the addition of 0.38 mole of diethylaminoethyl chloride. The reaction mixture was heated at reflux temperature for 24 hours, cooled to 25 degrees, diluted with 1 liter of ether and extracted with three 800 milliliter of 37 percent hydrochloric acid diluted to 800 milliliters). The aqueous extract was washed once with 800 milliliters of ether. The organic extracts were combined, dried over anhydrous sodium sulfate and evaporated to give the dry residue of the unreacted material.

The aqueous acidic phase was extracted with three 500-milliliter portions of methylene dichloride and these extracts were combined, dried and evaporated and the residue twice recrystallized from acetone to give, in 33 percent yield, 3β-(2-diethylaminoethylthio)-5-androsten-17-one hydrochloride of melting point 186 to 189 degrees and rotation $[\alpha]_D$ plus 8 degrees.

*Analysis.*—Calcd. for $C_{25}H_{42}ClNOS$: C, 68.22; H, 9.62; N, 3.18; S, 7.29; Cl. 8.06. Found: C, 67.78; H, 9.56; N, 3.23; S, 7.18; Cl, 8.12.

PREPARATION 7

*3β-(2-diethylaminoethylthio)-5-androsten-17-one N-oxide hydrochloride*

To a mixture of 0.38 mole of diethylaminoethyl chloride, dissolved in 250 milliliters of ethanol and cooled in an ice-bath, was added 125 milliliter of 30 percent hydrogen peroxide. After standing at about five degrees for 18 hours, the excess hydrogen peroxide was destroyed by the portion-wise addition of platinum oxide catalyst. After filtration, the solvent was evaporated in vacuo to yield crude diethylaminoethyl chloride N-oxide.

This crude diethylaminoethyl chloride N-oxide was added to a benzene solution of the lithium salt of 3β-mercapto-5-androsten-17-one 17-ethylene ketal, prepared as in Preparation 6. The reaction mixture was heated at reflux for 24 hours, cooled to room temperature, diluted with 1000 milliliters of ether and extracted with three portions of 750 milliliters of hydrochloric acid (one part 37 percent hydrochloric acid and nine parts water). The aqueous extract was washed once with 750 milliliters of ether. The aqueous acidic phase was extracted with three 500-milliliter portions of methylene dichloride, the extracts were combined, dried, evaporated and the thus-obtained residue twice recrystallized from ethanol to give 3β-(2-diethylaminoethylthio)-5-androsten-17-one N-oxide hydrochloride.

In the same manner given in Preparation 7, the N-oxides of dimethylaminoethyl chloride, diethylaminopropyl chloride, dimethylaminopropyl chloride, diethylaminobutyl chloride, dimethylaminobutyl chloride, diethylaminopentyl chloride, dimethylaminopentyl chloride, diethylaminohexyl chloride, dimethylaminohexyl chloride can be made, which upon reaction with a selected lithium salt of 3β-mercapto-5-androsten-17-one 17-ketal, as shown in Preparation 6, result in the corresponding 3β-(2-dialkylaminoalkylthio)-5-androsten-17-one N-oxide hydrochloride. Thus from:

(a) 3β - mercapto - 5 - androsten-17-one with diethylaminopropyl chloride N-oxide was obtained 3β-(3-diethylaminopropylthio)-5-androsten-17-one N-oxide hydrochloride.

(b) 3β - mercapto - 5 - androsten-17-one with diethylaminobutyl chloride N-oxide was obtained 3β-(4-diethylaminobutylthio)-5-androsten-17-one N-oxide hydrochloride.

(c) 3β - mercapto - 5 - androsten-17-one with diethylaminopentyl chloride N-oxide was obtained 3β-(5-diethylaminopentylthio)-5-androsten-17-one N-oxide hydrochloride.

(d) 3β - mercapto - 5 - androsten-17-one with diethylaminohexyl chloride N-oxide was obtained 3β-(6-diethylaminohexylthio)-5-androsten-17-one N-oxide hydrochloride.

(e) 3β-mercapto - 5 - androsten-17-one with dimethylaminobutyl chloride N-oxide was obtained 3β-(4-dimethylaminobutylthio)-5-androsten-17-one N-oxide hydrochloride.

(f) 3β-mercapto - 5 - androsten-17-one with dimethylaminopentyl chloride N-oxide was obtained 3β-(5-dimethylaminopentylthio)-5-androsten-17-one N-oxide hydrochloride.

(g) 3β-mercapto - 5 - androsten-17-one with dimethylaminohexyl chloride N-oxide was obtained 3β-(6-dimethylaminohexylthio)-5-androsten-17-one N-oxide hydrochloride.

(h) 3β-mercapto - 5 - androsten-17-one with morpholinylbutyl chloride N-oxide was obtained 3β-(4-morpholinylbutylthio)-5-androsten-17-one N-oxide hydrochloride.

(i) 3β-mercapto-6-methyl-5-androsten-17-one with diethylaminoethyl chloride N-oxide was obtained 3β-(3-diethylaminoethylthio)-6-methyl-5-androsten-17-one N-oxide hydrochloride.

(j) 3β-mercapto-6-methyl-5-androsten-17-one with diethylaminohexyl chloride N-oxide was obtained 3β-(6-diethylaminohexylthio)-6-methyl-5-androsten-17-one N-oxide hydrochloride.

(k) 3β-mercapto-6-methyl-5-androsten-17-one with morpholinylhexyl chloride N-oxide was obtained 3β-(6-morpholinylhexylthio)-6-methyl-5-androsten-17-one N-oxide hydrochloride.

PREPARATION 8

*3β-(3-diethylaminopropoxy)-5-androsten-17-one hydrochloride*

In the same manner given in Preparation 6, but using 3-hydroxy-5-androsten-17-one as starting steroid and diethylaminopropyl chloride as etherification agent, there was produced in 20 percent yield 3β-(3-diethylaminopropoxy)-5-androsten-17-one hydrochloride of melting point 212 to 213.

*Analysis.*—Calcd. for $C_{26}H_{44}ClNO_2$: C, 71.28; H, 10.13; N, 3.20; Cl, 8.09. Found: C, 70.73; H, 10.03; N, 3.28; Cl, 8.20.

PREPARATION 9

*3β-(2-dimethylaminoethoxy)-5-androsten-17-one hydrochloride*

In the same manner given in Preparation 6, 3β-hydroxy-5-androsten-17-one was converted with dimethylaminoethyl chloride to 3β-(2-dimethylaminoethoxy)-5-androsten-17-one of melting point 232 to 234 degrees.

*Analysis.*—Calcd. for $C_{23}H_{38}ClNO_2 \cdot H_2O$: C, 69.62; H, 10.22; N, 3.38; Cl, 8.57. Found: C, 69.47; H, 9.50; N, 3.56; Cl, 8.99.

PREPARATION 10

*3β-(2-morpholinylethoxy)-5-androsten-17-one hydrochloride*

In the same manner given in Preparation 6, 3β-hydroxy-5-androsten-17-one was converted with morpholinylethyl chloride to 3β-(2-morpholinylethoxy)-5-androsten-17-one hydrochloride which when recrystallized from ethyl acetate melted at 216 to 218 degrees centigrade with rotation $[\alpha]_D$ of plus 12 degrees in chloroform.

*Analysis.*—Calcd. for $C_{25}H_{40}ClNO_3$: C, 68.54; H, 9.20; N, 3.20; Cl, 8.10. Found: C, 67.91; H, 9.15; N, 3.35; Cl, 8.15.

PREPARATION 11

*3β-(2-diethylaminoethoxy)-5α-androstan-17-one, N-oxide, hydrochloride*

In the same manner as shown in Preparation 4, 3β-(2-diethylaminoethoxy)-5α-androstan-17-one hydrochloride monohydrate was converted to 3β-(2-diethylaminoethoxy)-5α-androstan-17-one N-oxide, hydrochloride in 43 percent yield with a melting point of 151 to 153 degrees and rotation $[\alpha]_D$ of plus 47 degrees in chloroform.

*Analysis.*—Calcd. for $C_{25}H_{44}ClNO_3$: C, 67.92; H, 10.03; N, 3.17; Cl. 8.02. Found: C, 67.68; H, 10.16; N, 3.19; Cl, 8.09.

PREPARATION 12

In the same manner given in Preparation 6, other 3-aminoethers and 3-thioaminoethers are obtained by converting a selected 3β-hydroxy or 3β-mercapto-5-androsten-17-one to its respective 17-ketal, treating the ketal with an alkali metal metathetically active reagent, e.g., butyl lithium, sodium or potassium hydride, sodium triphenylmethane and the like, and thereupon with a selected N-substituted aminoalkyl chloride. Thus from:

(a) 3β-hydroxy-5-androsten-17-one with diethylaminobutyl chloride was obtained 3β-(4-diethylaminobutoxy)-5-androsten-17-one hydrochloride.

(b) 3β-hydroxy-5-androsten-17-one with diethylaminopentyl chloride was obtained 3β-(5-diethylaminopentoxy)-5-androsten-17-one hydrochloride.

(c) 3β-hydroxy-5-androsten-17-one with diethylaminohexyl chloride was obtained 3β-(6-diethylaminohexyloxy)-5-androsten-17-one hydrochloride.

(d) 3β-hydroxy-5-androsten-17-one with dimethylaminobutyl chloride was obtained 3β-(4-dimethylaminobutoxy)-5-androsten-17-one hydrochloride.

(e) 3β-hydroxy-5-androsten-17-one with morpholinylbutyl chloride was obtained 3β-(4-morpholinylbutoxy)-5-androsten-17-one hydrochloride.

(f) 3β-hydroxy-5-androsten-17-one with dimethylaminopentyl chloride was obtained 3β-(5-dimethylaminopentoxy)-5-androsten-17-one hydrochloride.

(g) 3β-hydroxy-5-androsten-17-one with morpholinylpentyl chloride was obtained 3β-(5-morpholinylpentoxy)-5-androsten-17-one hydrochloride.

(h) 3β-hydroxy-5-androsten-17-one with dimethylaminohexyl chloride was obtained 3β-(6-dimethylaminohexyloxy)-5-androsten-17-one hydrochloride.

(i) 3β-hydroxy-5-androsten-17-one with morpholinylhexyl chloride was obtained 3β-(6-morpholinylhexyloxy)-5-androsten-17-one hydrochloride.

(j) 3β-mercapto-5-androsten-17-one with diethylaminopropyl chloride was obtained 3β-(3-diethylaminopropylthio)-5-androsten-17-one hydrochloride.

(k) 3β-mercapto-5-androsten-17-one with diethylaminobutyl chloride was obtained 3β-(4-diethylaminobutylthio)-5-androsten-17-one hydrochloride.

(l) 3β-mercapto-5-androsten-17-one with diethylaminopentyl chloride was obtained 3β-(5-diethylaminopentylthio)-5-androsten-17-one hydrochloride.

(m) 3β-mercapto-5-androsten-17-one with diethylaminohexyl chloride was obtained 3β-(6-diethylaminohexylthio)-5-androsten-17-one hydrochloride.

(n) 3β-mercapto-5-androsten-17-one with dimethylaminobutyl chloride was obtained 3β-(4-dimethylaminobutylthio)-5-androsten-17-one hydrochloride.

(o) 3β-mercapto-5-androsten-17-one with dimethylaminopentyl chloride was obtained 3β-(5-dimethylaminopentylthio)-5-androsten-17-one hydrochloride.

(p) 3β-mercapto-5-androsten-17-one with dimethylaminohexyl chloride was obtained 3β-(6-dimethylaminohexylthio)-5-androsten-17-one hydrochloride.

(q) 3β-mercapto-5-androsten-17-one with morpholinylbutyl chloride was obtained 3β-(4-morpholinylbutylthio)-5-androsten-17-one hydrochloride.

(r) 3β-mercapto-5-androsten-17-one with morpholinylpentyl chloride was obtained 3β-(5-morpholinylpentylthio)-5-androsten-17-one hydrochloride.

(s) 3β-mercapto-5-androsten-17-one with morpholinylhexyl chloride was obtained 3β-(6-morpholinylhexylthio)-5-androsten-17-one hydrochloride.

PREPARATION 13

In the same manner given in Preparations 6 and 7, 3-amino-6-methylethers and -thioethers are obtained by converting selected 3β-hydroxy-6-methyl- or 3β-mercapto-6-methyl-5-androsten-17-ones, to its respective ketals, treating the ketals with butyl lithium and thereupon with a selected N-substituted aminoalkyl or morpholino-N-alkyl chloride. Thus from:

(a) 3β-hydroxy-6-methyl-5-androsten-17-one with diethylaminoethyl chloride was obtained 3β-(2-diethylaminoethoxy)-6-methyl-5-androsten-17-one hydrochloride.

(b) 3β-hydroxy-6-methyl-5-androsten-17-one with diethylaminobutyl chloride was obtained 3β-(4-diethylaminobutoxy)-6-methyl-5-androsten-17-one hydrochloride.

(c) 3β-hydroxy-6-methyl-5-androsten-17-one with diethylaminohexyl chloride was obtained 3β-(6-diethylaminohexyloxy)-6-methyl-5-androsten-17-one hydrochloride.

(d) 3β-hydroxy-6-methyl-5-androsten-17-one with dimethylaminobutyl chloride was obtained 3β-(4-dimethylaminobutoxy)-6-methyl-5-androsten-17-one hydrochloride.

(e) 3β-hydroxy-6-methyl-5-androsten-17-one with morpholinylethyl chloride was obtained 3β-(4-morpholinylethoxy)-6-methyl-5-androsten-17-one hydrochloride.

(f) 3β-hydroxy-6-methyl-5-androsten-17-one with dimethylaminohexyl chloride was obtained 3β-(6-dimethylaminohexyloxy)-6-methyl-5-androsten - 17 - one hydrochloride.

(g) 3β-mercapto-6-methyl-5-androsten-17-one with diethylaminoethyl chloride was obtained 3β-(3-diethylaminoethylthio)-6-methyl-5-androsten-17-one hydrochloride.

(h) 3β-mercapto-6-methyl-5-androsten-17-one with diethylaminobutyl chloride was obtained 3β-(4-diethylaminobutylthio)-6-methyl-5-androsten - 17 - one hydrochloride.

(i) 3β-mercapto-6-methyl-5-androsten-17-one with diethylaminohexyl chloride was obtained 3β-(6-diethylaminohexylthio)-6-methyl-5-androsten-17 - one hydrochloride.

(j) 3β-mercapto-6-methyl-5-androsten-17-one with dimethylaminohexyl chloride was obtained 3β-(6-dimethylaminohexylthio)-6-methyl-5-androsten-17-one hydrochloride.

(k) 3β-mercapto-6-methyl-5-androsten-17 - one with morpholinylhexyl chloride was obtained 3β-(6-morpholinylhexylthio)-6-methyl-5-androsten-17 - one hydrochloride.

PREPARATION 14

3β-(2-diethylaminopropoxy)-5α-androstan-17-one hydrochloride monohydrate

In the same manner given in Preparation 5, hydrogenating 3β - 2-diethylaminopropoxy)-5-androsten - 17-one hydrochloride in methanol with hydrogen in the presence of a palladium catalyst on carbon produces the 3β-(2-diethylaminopropoxy) - 5α-androstan - 17-one hydrochloride.

In the same manner as shown in Preparation 5, other 3-amino and 3-aminothioethers of unsaturated steroids, as prepared in the foregoing preparations, can be reduced to give the corresponding saturated 3-amino steroid ethers and -thioethers.

Representative products such produced include:

3β - (2-diethylaminoethoxy) - 6α-methyl-5α-androstan-17-one hydrochloride;

3β - (3-dimethylaminopropoxy)-5α-androstan-17-one hydrochloride;

3β - (3-diethylaminopropoxy)-6α-methyl-5α - androstan-17-one hydrochloride;

3β - (4-diethylaminobutyloxy)-androstan-17-one hydrochloride;

3β - (2-diethylaminoethylthio)-5α-androstan-17-one hydrochloride;

3β - (2-diethylaminoethylthio)-6α-methyl-5α - androstan-17-one hydrochloride.

PREPARATION 15

3β-(2-diethylaminoethylsulfinyl)-5-androsten-17-one N-oxide hydrochloride

In the same manner given in Preparation 4, a solution of 3β-(2-diethylaminoethylthio)-5-androsten-17-one hydrochloride, dissolved in methanol, was treated with sodium hydroxide to give the free base. The thus-obtained free base 3β-(2-diethylaminoethylthio)-5-androsten-17-one was recovered from the reaction mixture by filtration and evaporation of the filtrate. The residue thus-obtained was purified by recrystallization from methylene dichloride. After purification, the residue was dissolved in ethanol, the ethanol solution cooled in an ice bath and treated with a solution of 30 percent hydrogen peroxide. After standing at about 25° for 18 hours, the excess hydrogen peroxide was destroyed by adding platinum oxide catalyst. Filtration and evaporation of the filtrate gave a white, solid precipitate which was redissolved in ether and precipitated from the ether solution by letting hydrogen chloride gas bubble through it. The thus-obtained material was recrystallized from acetone to give 3β-(2-diethylaminoethylsulfinyl)-5-androsten-17-one N-oxide hydrochloride.

In the same manner as shown in Preparation 4, other N-oxide hydrochlorides and N-oxide sulfinyl hydrochlorides of 3-amino steroid ethers are prepared by reacting the free amino base with hydrogen peroxide and recovering the N-oxides as hydrochlorides. Representative compounds thus-obtained include:

3β-(3-diethylaminopropoxy)-5-androsten-17-one N-oxide hydrochloride;

3β-(4-diethylaminobutyloxy)-5-androsten-17-one N-oxide hydrochloride;

3β-(6-diethylaminohexyloxy)-5-androsten-17-one N-oxide hydrochloride;

3β-(3-diethylaminopropylsulfinyl)-5-androsten-17-one N-oxide hydrochloride;

3β-(4 - diethylaminobutylsulfinyl)-5-androsten-17-one N-oxide hydrochloride;

3β-(6-diethylaminohexylthio)-5-androsten-17-one N-oxide hydrochloride;

3β-(3-diethylaminopropoxy)-6-methyl-5-androsten-17-one N-oxide hydrochloride;

3β-(4-diethylaminobutyloxy)-6-methyl - 5 - androsten-17-one N-oxide hydrochloride;

3β-(6-diethylaminohexyloxy)-6-methyl - 5 - androsten-17-one N-oxide hydrochloride;

3β-(3 - diethylaminopropylsulfinyl)-6-methyl-5-androsten-17-one N-oxide hydrochloride;

3β-(4-diethylaminobutylsulfinyl)-6-methyl - 5 - androsten-17-one N-oxide hydrochloride;

3β-(6-diethylaminohexylsulfinyl) - 6 - methyl-5-androsten-17-one N-oxide hydrochloride.

PREPARATION 16

3β-(2-diethylaminoethoxy)-5-androsten-17-one

A solution of 6.0 grams of 3β-(2-diethylaminoethoxy)-5-androsten-17-one hydrochloride in water was made basic with solid sodium bicarbonate and the precipitate taken up in ether-benzene. The free base, 3β-(2-diethylaminoethoxy)-5-androsten-17-one, was obtained as an oily solid upon evaporation of the solvent in vacuo.

In the same manner given in Preparation 16, the hydrochlorides of amino steroid ethers in the earlier disclosed Preparations 4–15 are converted to their free bases by neutralization with bases such as aqueous alcoholic sodium or potassium hydroxides, calcium hydroxide, carbonates and bicarbonate of alkali and earth alkali metals.

EXAMPLE 1

3β-(2-diethylaminoethoxy)-17-isonitroso-5-androstene

To a solution in 150 milliliters of ethanol of 3β-(diethylaminoethoxy)-5-androsten-17-one, prepared by treating 7.5 grams of the hydrochloride of 3β-(diethylaminoethoxy)-5-androsten-17-one hydrochloride with a base, there was added 12 grams of hydroxylamine hydrochloride followed by 9.7 grams of potassium hydroxide in 15 milliliters of water. The mixture was heated under vigorous reflux for 20 minutes and then in a bath at 80° centigrade for 45 minutes. The mixture was thereupon filtered to remove insoluble inorganic material and the filtrate acidified by a stream of carbon dioxide. The material was then concentrated in vacuo, the solution diluted with water and extracted with three portions of 75 milliliters each of methylene chloride. The methylene chloride extracts were dried over anhydrous sodium sulfate and evaporated. The solid, thus recovered, was crystallized from aqueous methanol to yield 5.02 grams of 3β-(2-diethylaminoethoxy)-17-isonitroso-5-androstene of melting point 140 to 142 degrees.

Analysis.—Calcd. for $C_{25}H_{42}N_2O_2$: C, 74.58; H, 10.52; N, 6.96. Found: C, 74.78; H, 10.32; N, 6.99.

EXAMPLE 2

*3β-(2-diethylaminoethoxy)-17-isonitroso-5α-androstene*

In the manner given in Example 1, 2 grams of 3β-(2-diethylaminoethoxy)-5α-androstan-17-one in 60 milliliters of ethanol with 5 grams of hydroxylamine hydrochloride and 3.5 grams of sodium hydroxide in the presence of 5 milliliter of water was heated to reflux for a period of 75 minutes. The mixture was thereupon allowed to cool to room temperature, poured into 250 milliliters of water and extracted with methylene chloride. The methylene chloride portions were combined, dried over anhydrous sodium sulfate and evaporated to give a residue which was four times recrystallized from aqueous methanol to give needles of 3β-(2-diethylaminoethoxy)-17-isonitroso-5α-androstane of melting point 120 to 125 degrees.

Analysis.—Calcd. for $C_{25}H_{44}N_2O_2$: C, 74.21; H, 10.96; N, 6.92. Found: C, 74.23; H, 10.76; N, 7.00.

3β-(2 - diethylaminoethoxy) - 17 - isonitroso-5α-androstane can also be prepared from 3β-(2-diethylaminoethoxy)-17-isonitroso-5-androstene by hydrogenation in the following manner:

To a solution of 2.4 grams of 3β-(2-diethylaminoethoxy)-17-isonitroso-5-androstene in 200 milliliters of acetic acid containing 8 milliliters of concentrated hydrochloric acid there was added 0.25 gram of platinum oxide. The suspension was shaken in an atmosphere of hydrogen for 18 hours. The catalyst was then removed by filtration and the filtrate taken to dryness in vacuo. The residual oil was suspended in water, made alkaline with sodium bicarbonate and the mixture extracted with ether. The organic layer was washed with water, dried by percolation through sodium sulftae and evaporated in vacuo.

EXAMPLE 3

*3β-(2-diethylaminoethoxy)-17-isonitroso-5-androstene N-oxide*

In the manner given in Example 1, treating 3β-(2-diethylaminoethoxy)-5-androsten-17-one N-oxide, dissolved in isopropyl alcohol, with hydroxyl-amine sulfate and sodium hydroxide, on a water-bath at 75 degrees, resulted in 3β-(2-diethylaminoethoxy)-17-isonitroso-5-androstene N-oxide.

EXAMPLE 4

*3β-(2-diethylaminoethylthio)-17-isonitroso-5-androstene*

A solution of 5 grams of 3β-(2-diethylaminoethylthio)-5-androsten-17-one in 125 milliliters of ethanol was refluxed after addition of 10 grams of hydroxylamine hydrochloride and 7.5 grams of potassium hydroxide in 10 milliliters of water. After two hours of reflux the mixture was filtered, the filtrate was acidified with 10 percent aqueous acetic acid, then poured into water and the aqueous reaction mixture extracted with 4 fifty-milliliter portions of ethylene dichloride. The ethylene dichloride extracts were combined, dried over anhydrous sodium sulfate and evaporated to give a solid. The solid material was crystallized twice from aqueous methanol to give 3β-(2 - diethylaminoethylthio)-17-isonitroso-5-androstene in crystalline form.

EXAMPLE 5

*3β-(2-diethylaminoethylthio)-17-isonitroso-5-androstene N-oxide*

In the same manner given in Example 4, 3β-(2-diethylaminoethylthio)-5-androsten-17-one N-oxide was reacted with hydroxylamine hydrochloride and sodium hydroxide in ethanol solution to give 3β-(2-diethylaminoethylthio)-17-isonitroso-5-androstene N-oxide.

EXAMPLE 6

*3β-(2-diethylaminoethoxy)-6-methyl-17-isonitroso-5-androstene*

A solution of 2 grams of 3β-(2-diethylaminoethoxy)-6-methyl-5-androsten-17-one in 50 milliliters of methanol was refluxed after addition of 3 grams of hydroxylamine hydrochloride and 2 grams of sodium hydroxide in 3 milliliters of water. After 90 minutes of reflux the mixture was filtered and the resulting filtrate was acidified with carbon dioxide, then poured into excess water and the reaction mixture was extracted with methylene dichloride. Methylene dichloride extracts were combined and evaporated as in Example 4 to give 3β-(2-diethylaminoethoxy)-6-methyl-17-isonitroso-5-androstene.

EXAMPLE 7

*3β-(2-diethylaminoethylthio)-6-methyl-17-isonitroso-5-androstene*

A solution of 2 grams of 3β-(2-diethylaminoethylthio)-6-methyl-5-androsten-17-one in 50 milliliters of methanol was refluxed after addition of 3 grams of hydroxylamine hydrochloride and 2 grams of sodium hydroxide in 3 milliliters of water. After 90 minutes of reflux the mixture was filtered and the resulting filtrate was acidified with carbon dioxide, then poured into excess water and the reaction mixture extracted with methylene dichloride. The methylene dichloride extracts were combined and evaporated as in Example 4 to give 3β-(2-diethylaminoethylthio)-6-methyl-17-isonitroso-5-androstene.

EXAMPLE 8

*3β-(2-diethylaminoethoxy)-6-methyl-17-isonitroso-5-androstene N-oxide*

In the manner given in Example 4, 3β-(2-diethylaminoethoxy)-6-methyl-5-androsten-17-one N-oxide was refluxed with hydroxylamine in the presence of a base in alcohol solution to give 3β-(2-diethylaminoethoxy)-6-methyl-17-isonitroso-5-androstene N-oxide.

EXAMPLE 9

*3β-(2-diethylaminoethylthio)-6-methyl-17-isonitroso-5-androstene N-oxide*

In the manner given in Example 4, 3β-(2-diethylaminoethylthio) - 6 - methyl-5-androsten-17-one N - oxide was heated with hydroxylamine in the presence of sodium hydroxide in ethanol solution to give 3β-(2-diethylaminoethylthio)-6-methyl-17-isonitroso-5-androstene N-oxide.

EXAMPLE 10

*3β-(2-diethylaminoethoxy)-17-isonitroso-5α-androstane N-oxide*

In the manner given in Example 4, an ethanol solution of 3β-(2-diethylaminoethoxy) - 5α - androstan-17-one N-oxide was refluxed with hydroxylamine hydrochloride and pyridine. The solution was poured into excess water neutralized with dilute hydrochloric acid and filtered. The precipitate on the filter was three times recrystallized from aqueous methanol to give 3β-(2-diethylaminoethoxy)-17-isonitroso-5α-androstane N-oxide.

EXAMPLE 11

*3β-(2-morpholinoethoxy)-17-isonitroso-5-androstene*

In the same manner given in Example 1, 3β-(2-morpholinoethoxy)-5-androsten-17-one was refluxed with hydroxylamine hydrochloride and potassium hydroxide for 2 hours. The reaction mixture was filtered, treated with carbon dioxide and extracted with ethylene dichloride. The ethylene dichloride fractions were combined, dried and evaporated and the thus-obtained residue three times recrystallized from methanol to give 3β-(2-morpholinoethoxy)-17-isonitroso-5-androstene.

EXAMPLE 12

*3β-(3-diethylaminopropoxy)-17-isonitroso-5-androstene*

In the manner given in Example 4, 3β-(3-diethylaminopropoxy)-5-androsten-17-one was refluxed in ethanol solution with hydroxylamine hydrochloride and potassium hydroxide. The reaction mixture was thereupon allowed to cool, filtered and the filtrate saturated with carbon dioxide and extracted with ethylene dichloride. The ethylene dichloride fractions were concentrated to give a dry residue which was three times crystallized from methylene chloride to give 3β-(3-diethylaminopropoxy)-17-isonitroso-5-androstene.

EXAMPLE 13

In the manner given in Example 1, other 3β-(dialkylaminoalkyloxy- and morpholinoalkyloxy)-androstene and androstanes having a 17-keto group are treated in ethanolic solution with hydroxylamine hydrochloride and a base to give the corresponding 17-isonitroso compound. Thus from:

(a) 3β-(2 - dimethylaminoethoxy)-5-androsten-17-one is obtained 3β-(2-dimethylaminoethoxy)-17-isonitroso-5-androstene.

(b) 3β-(3-dimethylaminopropoxy) - 5 - androsten-17-one is obtained 3β-(3-dimethylaminopropoxy)-17-isonitroso-5-androstene.

(c) 3β-(4-dimethylaminobutyloxy) - 5 - androsten-17-one is obtained 3β-(4-dimethylaminobutyloxy)-17-isonitroso-5-androstene.

(d) 3β - (6 - dimethylaminohexyloxy)-5-androsten-17-one is obtained 3β-(6-dimethylaminohexyloxy)-17-isonitroso-5-androstene.

(e) 3β-(3 - morpholinopropoxy)-5-androsten-17-one is obtained 3β-(3 - morpholinopropoxy)-17-isonitroso-5-androstene.

(f) 3β-(4-diethylaminobutyloxy)-5-androsten-17-one is obtained 3β-(4-diethylaminobutyloxy)-17-isonitroso-5-androstene.

(g) 3β-(5-diethylaminopentyloxy) - 5 - androsten-17-one is obtained 3β-(5-diethylaminopentyloxy)-17-isonitroso-5-androstene.

(h) 3β-(6 - diethylaminohexyloxy)-5-androsten-17-one is obtained 3β-(6-diethylaminohexyloxy)-17-isonitroso-5-androstene.

(i) 3β-(4 - morpholinobutyloxy)-5-androsten-17-one is obtained 3β-(4 - morpholinobutyloxy)-17-isonitroso-5-androstene.

(j) 3β-(6 - morpholinohexyloxy)-5-androsten-17-one is obtained 3β-(6 - morpholinohexyloxy)-17-isonitroso-5-androstene.

(k) 3β - (2 - dimethylaminoethoxy) - 5 - androsten-17-one N-oxide is obtained 3β-(2-dimethylaminoethoxy)-17-isonitroso-5-androstene N-oxide.

(l) 3β - (6 - dimethylaminohexyloxy) - 5 - androsten-17-one N-oxide is obtained 3β-(6-dimethylaminohexyloxy)-17-isonitroso-5-androstene N-oxide.

(m) 3β - (3 - morpholinopropoxy) - 5 -androsten-17-one N-oxide is obtained 3β-(3-morpholinopropoxy)-17-isonitroso-5-androstene N-oxide.

(n) 3β - (4 - dimethylaminobutyloxy) - 5 - androsten-17-one N-oxide is obtained 3β-(4-dimethylaminobutyloxy)-17-isonitroso-5-androstene N-oxide.

(o) 3β - (4 - diethylaminobutyloxy) - 6 - methyl - 5-androsten-17-one is obtained 3β-(4-diethylaminobutyloxy)-6-methyl-17-isonitroso-5-androstene.

(p) 3β - (6 - diethylaminohexyloxy) - 6 - methyl - 5-androsten-17-one is obtained 3β-(6-diethylaminohexyloxy)-6-methyl-17-isonitroso-5-androstene.

(q) 3β - (3 - morpholinopropoxy) - 6 - methyl - 5-androsten-17-one is obtained 3β-(3-morpholinopropoxy)-6-methyl-17-isonitroso-5-androstene.

(r) 3β - (5 - morpholinopentoxy) - 6 - methyl - 5-androsten-17-one is obtained 3β-(5-morpholinopentoxy)-6-methyl-17-isonitroso-5-androstene.

(s) 3β - (6 - morpholinohexylthio) - 6 - methyl - 5-androsten-17-one is obtained 3β-(6-morpholinohexylthio)-6-methyl-17-isonitroso-5-androstene.

(t) 3β - (4 - dimethylaminobutyloxy) - 6 - methyl - 5-androsten-17-one is obtained 3β-(4-dimethylaminobutyloxy)-6-methyl-17-isonitroso-5-androstene.

(u) 3β - (6 - dimethylaminohexyloxy) - 6 - methyl - 5-androsten-17-one is obtained 3β-(6-dimethylaminohexyloxy)-6-methyl-17-isonitroso-5-androstene.

(v) 3β - (4 - diethylaminobutyloxy) - 6 - methyl - 5-androsten-17-one N-oxide is obtained 3β-(4-diethylaminobutyloxy)-6-methyl-17-isonitroso-5-androstene N-oxide.

(w) 3β - (6 - diethylaminohexyloxy) - 6 - methyl - 5-androsten-17-one N-oxide is obtained 3β-(6-diethylaminohexyloxy)-6-methyl-17-isonitroso-5-androstene N-oxide.

(x) 3β - (2 - diethylaminoethoxy) - 6α - methyl - 5α-androsten-17-one is obtained 3β-(2-diethylaminoethoxy)-6α-methyl-17-isonitroso-5α-androstene.

(y) 3β - (2 - diethylaminobutyloxy) - 6α - methyl - 5α-androsten-17-one is obtained 3β-(2-diethylaminobutyloxy)-6α-methyl-17-isonitroso-5α-androstene.

(z) 3β - (2 - diethylaminohexyloxy) - 6α - methyl - 5α-androsten-17-one is obtained 3β-(2-diethylaminohexyloxy)-6α-methyl-17-isonitroso-5α-androstene.

EXAMPLE 14

In the same manner given in Example 1, other 3β-dialkylaminoalkylthio and morpholinoalkylthio-androstene and -androstanes having a 17-keto group are treated in ethanolic solution with hydroxylamine hydrochloride and a base to give the corresponding 17-isonitroso compound.

Thus from:

(a) 3β - (3 - dimethylaminopropylthio) - 5 - androsten-17-one is obtained 3β-(3-dimethylaminopropylthio)-17-isonitroso-5-androstene.

(b) 3β - (4 - dimethylaminobutylthio) - 5 - androsten-17-one is obtained 3β-(4-dimethylaminobutylthio)-17-isonitroso-5-androstene.

(c) 3β - (6 - dimethylaminohexylthio) - 5 - androsten-17-one is obtained 3β-(6-dimethylaminohexylthio)-17-isonitroso-5-androstene.

(d) 3β - (3 - dimethylaminopropylthio) - 5 - androsten-17-one N-oxide is obtained 3β-(3-dimethylaminopropylthio)-17-isonitroso-5-androstene N-oxide.

(e) 3β - (4 - dimethylaminobutylthio) - 5 - androsten-17-one N-oxide is obtained 3β-(4-dimethylaminobutylthio)-17-isonitroso-5-androstene N-oxide.

(f) 3β - (6 - dimethylaminohexylthio) - 5 - androsten-17-one N-oxide is obtained 3β-(6-dimethylaminohexylthio)-17-isonitroso-5-androstene N-oxide.

(g) 3β - (3 - morpholinopropylthio) - 5 - androsten-17-one is obtained 3β-(3-morpholinopropylthio)-17-isonitroso-5-androstene.

(h) 3β - (4 - diethylaminobutylthio) - 5 - androsten-17-one is obtained 3β-(4-diethylaminobutylthio)-17-isonitroso-5-androstene.

(i) 3β - (4 - morpholinobutylthio) - 5 - androsten - 17-one is obtained 3β-(4-morpholinobutylthio)-17-isonitroso-5-androstene.

(j) 3β - (4 - diethylaminobutylthio) - 6 - methyl - 5-androsten-17-one is obtained 3β-(4-diethylaminobutylthio)-6-methyl-17-isonitroso-5-androstene.

(k) 3β - (6 - morpholinohexylthio) - 6 - methyl - 5-androsten-17-one is obtained 3β-(6-morpholinohexylthio)-6-methyl-17-isonitroso-5-androstene.

(l) 3β - (4 - diethylaminobutylsulfinyl) - 5 - androsten-17-one N-oxide is obtained 3β-(4-diethylaminobutylsulfinyl)-17-isonitroso-5-androstene N-oxide.

(m) 3β - (4 - diethylaminobutylsulfinyl) - 6 - methyl-5-androsten-17-one N-oxide is obtained 3β-(4-diethyl aminobutylsulfinyl) - 6 - methyl - 17 - isonitroso - 5-androstene N-oxide.

(n) 3β - (6 - diethylaminohexylsulfinyl) - 6 - methyl- 5-androsten-17-one N-oxide is obtained 3β-(6-diethyl aminohexylsulfinyl) - 6 - methyl - 17 - isonitroso - 5-androstene N-oxide.

(o) 3β - (3 - diethylaminopropylsulfinyl) - 5 - androsten-17-one N-oxide is obtained 3β-(3-diethylaminopropyl-sulfinyl)-17-isonitroso-5-androstene N-oxide.

(p) 3β - (4 - diethylaminobutylsulfinyl) - 5 - androsten-17-one N-oxide is obtained 3β-(4-diethylaminobutyl-sulfinyl)-17-isonitroso-5-androstene N-oxide.

(q) 3β - (6 - diethylaminohexylsulfinyl) - 6 - methyl-5-androsten-17-one N-oxide is obtained 3β-(6-dimethyl-aminohexylsulfinyl) - 6 - methyl - 17 - isonitroso - 5-androstene N-oxide.

EXAMPLE 15

*3β-(2-diethylaminoethoxy)17-isonitroso-5-androstene hydrochloride*

A solution was prepared containing one gram of 3β-(2-diethylaminoethoxy)-17-isonitroso-5-androstene in 20 milliliters of acetone. This solution was titrated with one normal aqueous hydrochloric acid until the pH was about 6.5. The reaction mixture was then evaporated in vacuo and the thus-obtained dry residue twice recrystallized from water to give 3β-(2-diethylaminoethoxy)-17-isonitroso-5-androstene hydrochloride.

EXAMPLE 16

*3β - (2 - diethylaminoethoxy)-17-isonitroso-5-androstene bisulfate*

To a solution of one gram of 3β-(2-diethylamino-ethoxy)-17-isonitroso-5-androstene in 20 milliliters of acetone was added a calculated amount of one normal sulfuric acid solution. The reaction mixture was then evaporated until crystallization began. The mixture was thereupon allowed to cool first at room temperature then in a refrigerator between 0–5° C. After standing over night in the refrigerator, the crystals were collected on filter, washed with water, then with methylene chloride, and thereupon recrystallized twice from water to give 3β-(2-diethylaminoethoxy)-17-isonitroso-5-androstene bisulfate.

In the same manner shown in Examples 15 and 16, mineral acid salts, e.g., the hydrochloride, hydrobromide or bisulfate of other 17-isonitroso-3-aminoethers or -thio-ethers of the androstane series, as disclosed in the prior examples, can be prepared.

We claim:

1. Steroid compounds selected from the group consisting of compounds of the formulae:

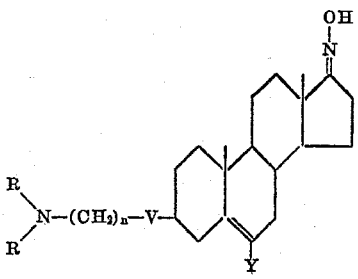

and

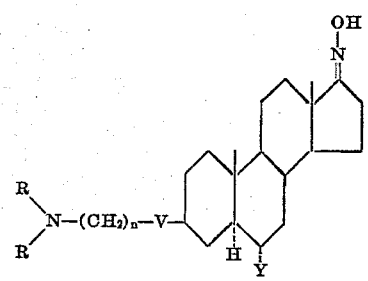

wherein $n$ has a value of 2 to 6, inclusive, wherein

is selected from the group consisting of

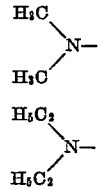

and

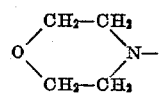

wherein V is selected from the group consisting of the elements oxygen and sulfur and wherein Y is selected from the group consisting of methyl and hydrogen.

2. 3β - (2 - diethylaminoethoxy)-17-isonitroso-5-androstene.

3. 3β-(2-diethylaminoethoxy) - 17 - isonitroso-5-androstene N-oxide hydrochloride.

4. 3β - (2 - diethylaminoethoxy) - 17-isonitroso-5α-androstane.

5. 3β - (2 - diethylaminoethylthio) - 17-isonitroso-5-androstene.

6. 3β - (2 - diethylaminoethylthio) - 17-isonitroso-5-androstene N-oxide.

7. 3β - (2 - diethylaminoethylthio) - 6 - methyl-17-isonitroso-5-androstene.

No references cited.

UNITED STATES PATENT OFFICE
CERTIFICATE OF CORRECTION

Patent No. 3,000,910 September 19, 1961

Robert D. Birkenmeyer et al.

It is hereby certified that error appears in the above numbered patent requiring correction and that the said Letters Patent should read as corrected below.

Column 5, line 68, after "milliliter" insert -- portions of dilute hydrochloric acid (80 milliliter --; column 11, line 38, for "sulftae" read -- sulfate --.

Signed and sealed this 20th day of February 1962.

(SEAL)
Attest:

ERNEST W. SWIDER
Attesting Officer

DAVID L. LADD
Commissioner of Patents